United States Patent
Yamaya

(10) Patent No.: US 7,461,189 B2
(45) Date of Patent: Dec. 2, 2008

(54) IMAGE RECORDER, IMAGE SUPPLYING METHOD AND PROGRAM

(75) Inventor: Kunihiko Yamaya, Kanagawa (JP)

(73) Assignee: Sony Corporation (JP)

( * ) Notice: Subject to any disclaimer, the term of this patent is extended or adjusted under 35 U.S.C. 154(b) by 95 days.

(21) Appl. No.: 11/231,589

(22) Filed: Sep. 21, 2005

(65) Prior Publication Data

US 2006/0082821 A1 Apr. 20, 2006

(30) Foreign Application Priority Data

Oct. 14, 2004 (JP) ............................. 2004-299539

(51) Int. Cl.
*G06F 13/00* (2006.01)
*G06F 3/00* (2006.01)
*G06F 13/14* (2006.01)
*G06F 13/36* (2006.01)

(52) U.S. Cl. ................... 710/104; 710/11; 710/10; 348/207.1; 348/207.2

(58) Field of Classification Search ............... None
See application file for complete search history.

(56) References Cited

U.S. PATENT DOCUMENTS 6,430,635 B1 * 8/2002 Kwon et al. ............... 710/104

2004/0090543 A1 * 5/2004 Suehiro .................. 348/231.99
2004/0109062 A1 * 6/2004 Yamaya ................... 348/207.1
2004/0189809 A1 * 9/2004 Choi ....................... 348/207.1
2005/0009468 A1 * 1/2005 Morozumi ................. 455/39
2005/0060447 A1 * 3/2005 Tanaka ....................... 710/62
2005/0140789 A1 * 6/2005 Yasuda ..................... 348/207.2
2006/0109349 A1 * 5/2006 Takashima ............... 348/207.1

FOREIGN PATENT DOCUMENTS

GB 2348772 10/2000

* cited by examiner

*Primary Examiner*—Paul R. Myers
*Assistant Examiner*—Ryan M Stiglic
(74) *Attorney, Agent, or Firm*—Lerner, David, Littenberg, Krumholz & Mentlik, LLP

(57) ABSTRACT

An image recorder for recording image data into a recording medium and supplying the image data recorded into the recording medium to a connected host through a predetermined communication interface, according to one of a plurality of different communication specifications, includes: a device configured to notify the host of information indicating a plurality of different usable communication specifications, in reply to a request from the host; a device configured to check the communication specification specified by the host, according to a return from the host based on the information indicating the different usable communication specifications notified by the notifying device; and a device configured to supply the image data recorded in the recording medium to the host through the predetermined communication interface, according to the communication specification checked by the checking device.

11 Claims, 8 Drawing Sheets

US 7,461,189 B2

IMAGE RECORDER, IMAGE SUPPLYING METHOD AND PROGRAM

CROSS-REFERENCE TO RELATED APPLICATIONS

The present invention contains subject matter related to Japanese Patent Application JP 2004-299539 filed in the Japanese Patent Office on Oct. 14, 2004, the entire contents of which being incorporated herein by reference.

BACKGROUND OF THE INVENTION

The invention relates to an image recorder, an image supplying method, and its program, and more particularly, to an image recorder, an image supplying method, and its program suitable for supplying image data to a USB host such as a personal computer or a printer connected through a USB (Universal Serial Bus) cable according to the corresponding communication specification of the USB host.

In the past, there has been a conventional digital still camera which has a function of communicating data according to the communication specification referred to as the Mass Storage Class as an external recorder of a personal computer (hereinafter, referred to as Mass Storage function), through establishing connection to the personal computer, a USB host, through a USB cable as a USB device (for example, Patent Article 1).

Further, there has been a digital still camera which has a function of supplying image data to a printer according to the communication specification referred to as Pict Bridge (hereinafter, referred to as Pict Bridge function), through connection to a printer, a USB host, through a USB cable. Here, the printer has to support the Pict Bridge function. Further, there has been a digital still camera having the both Mass Storage and Pict Bridge functions.

[Patent Article 1] Japanese Patent Laid-Open No. 305677/2002

SUMMARY OF THE INVENTION

The above-mentioned conventional digital still camera having the both Mass Storage and Pict Bridge functions has to be connected to a personal computer after a user selects the Mass Storage function, when the user tries to connect the camera to the personal computer. When a user tries to connect the camera to a printer, the user has to connect it to the printer after selecting the Pict Bridge function. A user may feel troublesome in this selecting operation of the Mass Storage function or the Pict Bridge function.

The invention addresses the above-identified situation and a need for communicating data according to one of a plurality of different communication specifications depending on the type of an electronic device of a connecting party, without necessity of a user's operation to select one of them.

An image recorder according to the invention includes a device configured to notify a host of the information indicating a plurality of different usable communication specifications, in reply to a request from the host; a device configured to check the communication specification specified by the host, according to a return from the host based on the information indicating the different usable communication specifications notified by the notifying device; and a device configured to supply the image data recorded in the recording medium to the host through a predetermined communication interface, according to the communication specification checked by the checking device.

The image recorder according to the invention further includes a device configured to select one of the different usable communication specifications. When one of the different usable communication specifications is selected by the selecting device, the notifying device notifies the host of the information indicating the communication specification selected by the selecting device, in reply to a request from the host.

An image supplying method according to the invention includes the steps of: notifying the host of information indicating a plurality of different usable communication specifications, in reply to a request from the host; checking the communication specification specified by the host, according to a return from the host based on the information indicating the different usable communication specifications notified through the processing in the notifying step; and supplying the image data recorded in the recording medium to the host through the predetermined communication interface, according to the communication specification checked through the processing in the checking step.

A program according to the invention makes a computer perform the processing including the steps of: notifying the host of information indicating a plurality of different usable communication specifications, in reply to a request from the host; checking the communication specification specified by the host, according to a return from the host based on the information indicating the different usable communication specifications notified through the processing in the notifying step; and supplying the image data recorded in the recording medium to the host through the predetermined communication interface, according to the communication specification checked through the processing in the checking step.

In the invention, the information indicating the plurality of different usable communication specifications is notified to a host, in reply to a request from the host, the communication specification specified by the host is checked according to a return from the host based on the information indicating the notified different usable communication specifications, and the image data recorded in the recording medium is supplied to the host through a predetermined communication interface, according to the checked communication specification.

According to the invention, it is possible to communicate data while switching the different communication specifications. Further, according to the invention, it is possible to communicate data according to one of the different communication specifications, corresponding to the type of a connected electronic device, without necessity of a user's operation to select one of them.

DETAILED DESCRIPTION

Although an embodiment of the invention will be hereinafter described, the components described in the Claims will be related to the concrete examples in the embodiment of the invention as follows. This is to confirm that the concrete examples of supporting this invention described in the Claims are described in the embodiment of the invention. Even when there is a concrete example which is not described in the Claims as the component although it is described in the embodiment of the invention, it does not mean that the concrete example does not correspond to the component. On the contrary, even when a concrete example is described here as one of the components, it does not mean that the concrete example does not correspond to any other component than the above component.

This description does not mean that the invention corresponding to the concrete examples described in the embodiment of the invention is all described in the Claims. In short, this description is about the invention corresponding to the concrete examples described in the embodiment of the invention and it is not to deny the presence of invention which is not described in the Claims of this specification, namely, the presence of invention that will be made through divisional application or amendment in future.

Figure 2:
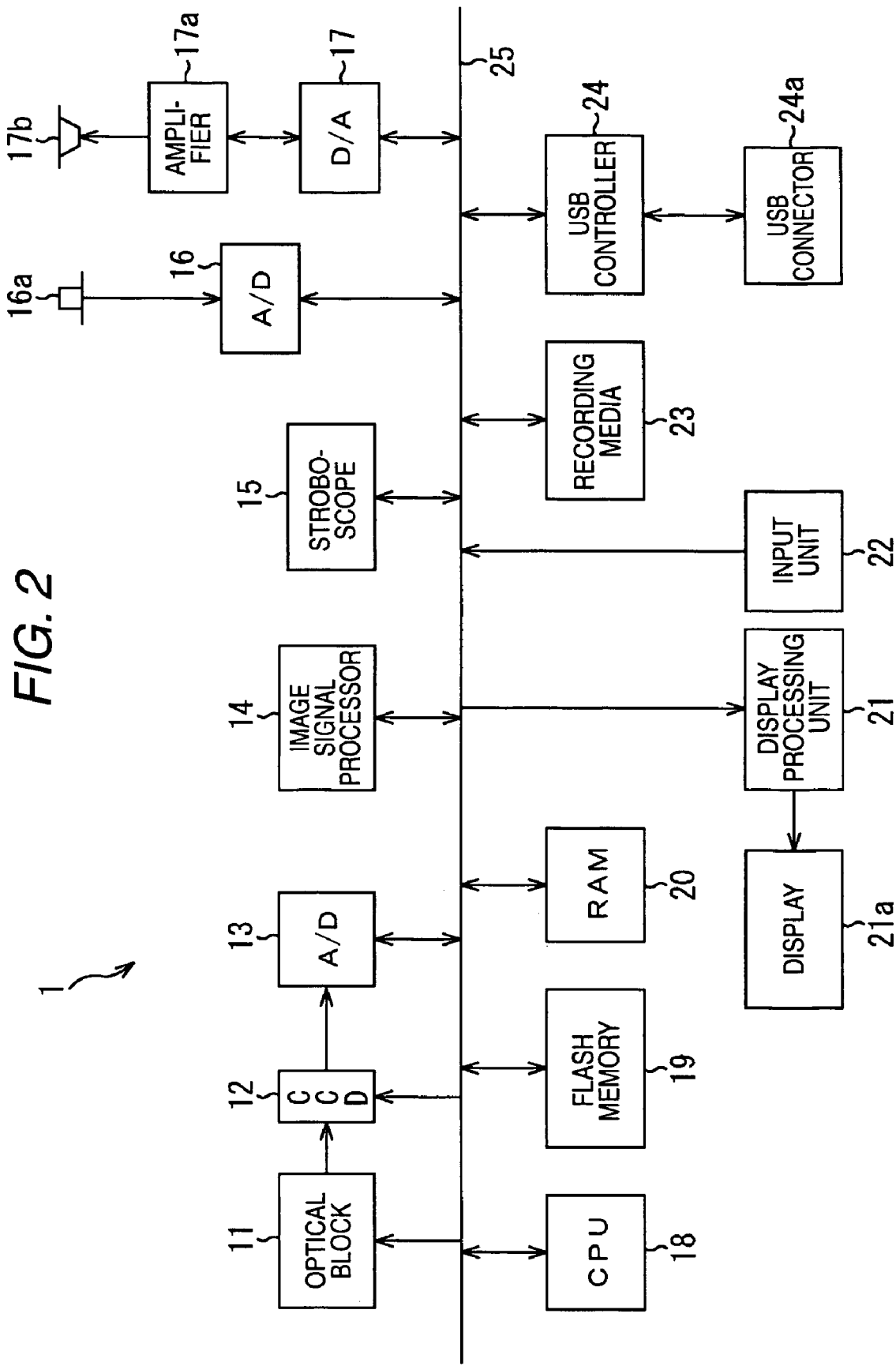
FIG. 2 is a block diagram showing the constitutional example of the DSC of FIG. 1.
Figure 3:
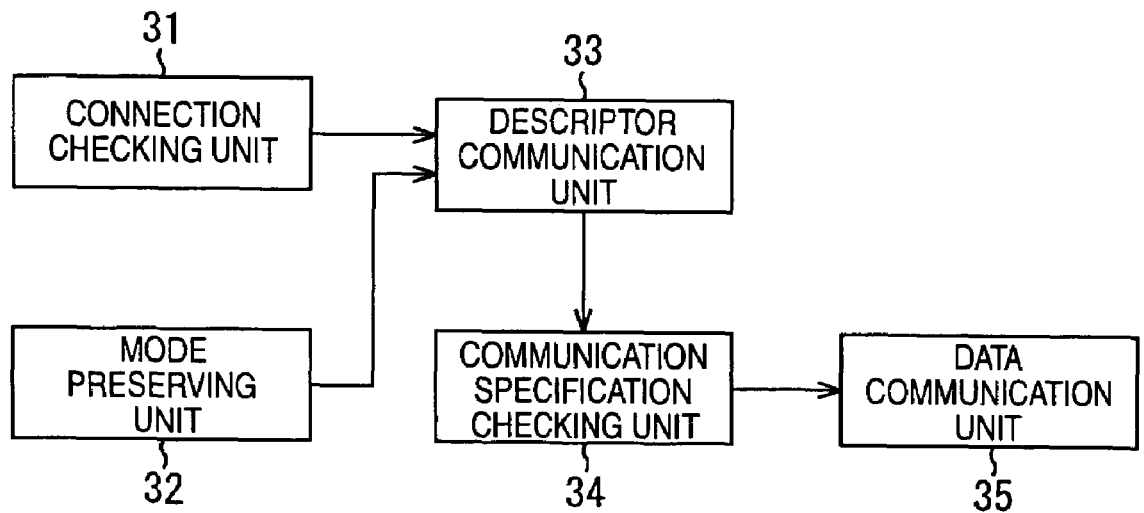
FIG. 3 is a block diagram showing the constitutional example of a USB controller of FIG. 2.

The image recorder (for example, DSC 1 in FIG. 1) according to an embodiment of the invention includes a device (for example, a descriptor communication unit 33 in FIG. 3) configured to notify the host (for example, the PC 3 or the printer 4 in FIG. 1) of the information indicating a plurality of different usable communication specifications (Pict Bridge and Mass Storage), in reply to a request from the host, a device (for example, a communication specification checking unit 34 in FIG. 3) configured to check the communication specification specified by the host, according to a return from the host based on the information indicating the different usable communication specifications notified by the notifying device, and a device (for example, a data communication unit 35 in FIG. 3) configured to supply the image data recorded into the recording medium (for example, a recording media 23 in FIG. 2) to the host through a predetermined communication interface (for example, a USB), according to the communication specification checked by the checking device.

The image recorder according to the embodiment of the invention further includes a device (for example, a cursor position determination button 43 in FIG. 4 for moving a cursor 55 of FIG. 5) configured to select one of the different usable communication specifications.

An image supplying method according to the embodiment of the invention includes a step (for example, Step S13 in FIG. 7) of notifying the host of the information indicating a plurality of different usable communication specifications, in reply to a request from the host, a step (for example, Step S15 in FIG. 7) of checking the communication specification specified by the host, according to a return from the host based on the information indicating the different usable communication specifications notified through the processing in the notifying step, and a step (for example, Step S17 or Step S20 in FIG. 7) of supplying the image data recorded in the recording medium to the host through the predetermined communication interface, according to the communication specification checked through the processing in the checking step.

Since the relationship between the components described in the Claim about the program of the invention and the concrete examples in the embodiment of the invention is the same as the relationship between the image supplying method of the invention and the concrete examples, its description is omitted here.

Hereinafter, an embodiment according to the invention will be particularly described referring to the drawings.

Figure 1:
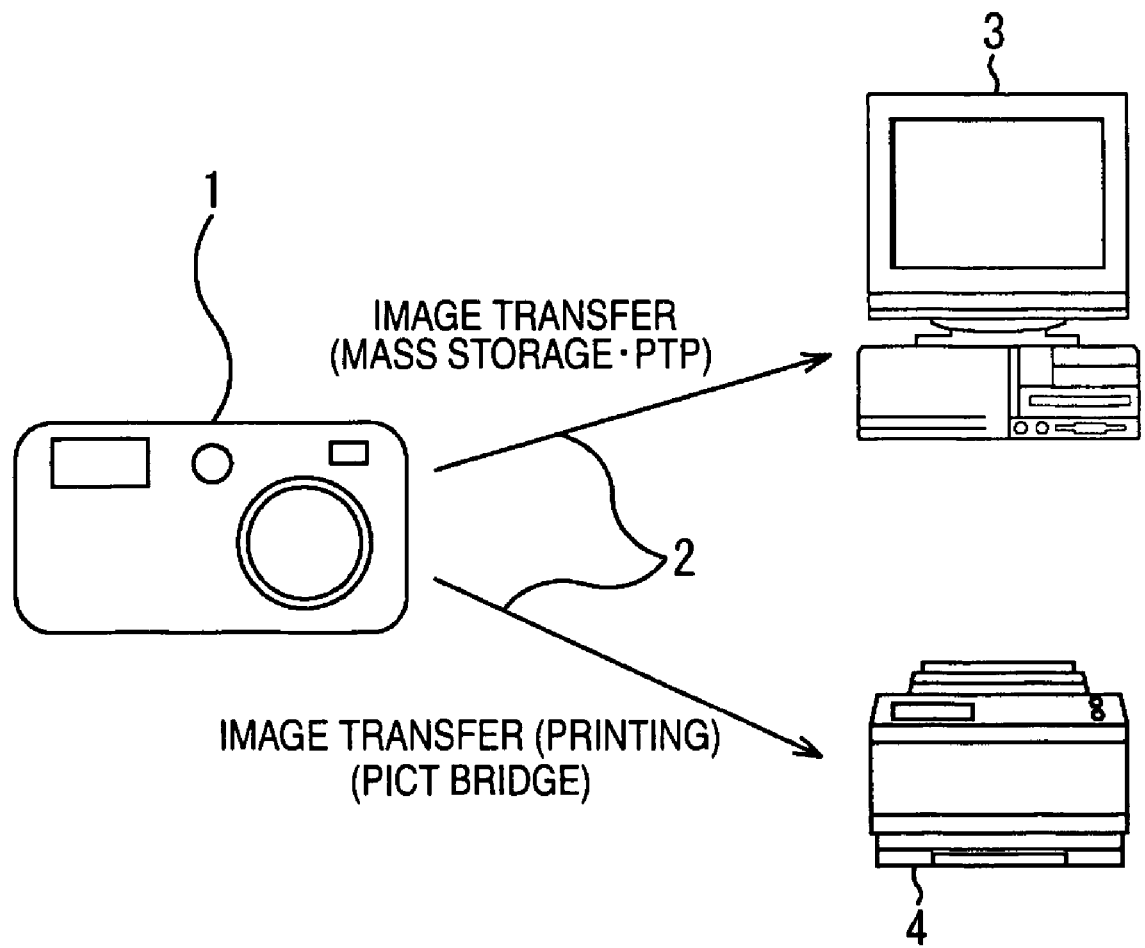
FIG. 1 is a view showing the constitutional example of a system including a DSC to which the invention is adopted.

FIG. 1 shows a constitutional example of a system including a digital still camera (DSC) that is one embodiment of the invention.

This digital still camera (hereinafter, abbreviated as DSC) 1 is a USB device and it can be operated by switching between Mass Storage Class (hereinafter, referred to as Mass Storage) that is the USB standard communication specification, PTP (Picture Transfer Protocol), and Pict Bridge. This USB device may have a plurality of configurations.

Specifically, the DSC 1 has a function (Mass Storage function) of communicating data according to the communication specification referred to as Mass Storage as an external recorder of a personal computer (hereinafter, abbreviated as PC) 3 when it is connected to the personal computer (PC) 3, a USB host, through a USB cable 2 and a function (Pict Bridge function) of supplying image data according to the communication specification referred to as Pict Bridge when it is connected to a printer 4, a USB host, through the USB cable 2. Further, the DSC 1 also has a function of communicating data according to the communication specification referred to as PTP when it is connected to the personal computer 3, the USB host, through the USB cable 2.

The personal computer 3 supports two types of communication specifications, Mass Storage and PTP. The PC 3 connected to the DSC 1 which is ready for the Mass Storage communication specification shares a recording media 23 (FIG. 2) mounted on the DSC 1 and it can perform various operations including copy, cut-away, and paste of data. The PC 3 connected to the DSC 1 which is ready for the PTP communication specification can take in the image data recorded in the recording media 23 and control shutter timing.

The printer 4 supports the Pict Bridge function of the DSC 1. The printer 4 connected to the DSC 1 which is ready for the Pict Bridge communication specification, can print out the corresponding image upon receipt of the image data recorded in the recording media 23, according to the control of the DSC 1.

Here, assume that the PC 3 and the printer 4 are the USB hosts that support their respective USB devices including a plurality of Configurations. The details of the USB host supporting a USB device including a plurality of Configurations have been already disclosed in the guide line CIPA DC001-2003 (Pict Bridge).

The DSC 1 supports the Pict Bridge function and it can be connected to a printer which does not support a USB device including a plurality of Configurations.

This DSC 1 is provided with three types of modes (standard mode, Pict Bridge mode, and PTP mode) so that a user can select the communication specification when communicating image data through the USB cable 2 (hereinafter, described as at a time of USB connection simply).

The standard mode is selected in the case where the PC 3 and the printer 4 intended to be connected to this are the USB hosts supporting their respective USB devices including a plurality of Configurations. In the standard mode, when the DSC 1 is connected to the PC 3, it communicates the image data according to the Mass Storage communication specification. While when it is connected to the printer 4, it communicates the image data according to the Pict Bridge communication specification.

The Pict Bridge mode is selected in the case where although a printer to be connected supports the Pict Bridge function, it does not support the USB device including a plurality of Configurations. In the Pict Bridge mode, when it is connected to a printer supporting the Pict Bridge function, it communicates the image data according to the Pict Bridge communication specification.

The PTP mode is selected in the case where the OS (Operating System) of a personal computer intended to be connected to this is Windows (registered trademark) XP and the upper level or MAC OS (trademark) and the upper level supporting the PTP. In the PTP mode, when it is connected to the personal computer supporting the PTP, it communicates the image data according to the PTP communication specification.

When a printer usually used by a user supports the Pict Bridge function and it is the printer 4 which supports a USB device including a plurality of Configurations, even when the user connects it to the PC 3 or the printer 4, he or she has only to select the standard mode generally, and when he or she changes the connection of the DSC 1 with from the PC 3 to the printer 4 or vice versus, he or she does not have to perform the operation of selecting the communication specification, hence to improve the convenience.

A user can select the above three types of modes at a USB connection by using a user interface displayed on a display 21a (FIG. 2) (the details will be described by reference to FIG. 4 and FIG. 5). The selected mode is to be effective even after the communication through the USB cable 2 finishes or the power is broken.

The constitutional example of the DSC 1 will be described referring to FIG. 2. The DSC 1 includes an optical block. 11, a CCD (Charge Coupled Device) 12, an A/D converter 13 for image pick-up signal, an image signal processor 14, a stroboscope 15, an A/D converter 16 for input sound signal, a D/A converter 17 for output sound signal, a CPU (Central Processing Unit) 18, a flash memory 19, a RAM (Random Access Memory) 20, a display processing unit 21, an input unit 22, a recording media 23, and a USB controller 24 through a system bus 25.

Figure 4:
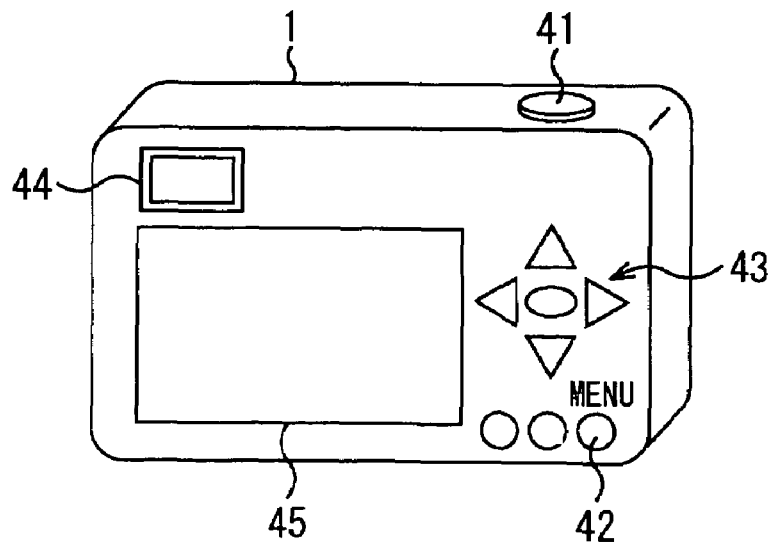
FIG. 4 is a perspective external view of the rear surface of the DSC.

The optical block 11 includes a lens for concentrating optical image of a subject on the CCD 12, a driving mechanism for moving the lens for focus adjustment and zoom, a shutter mechanism, an iris mechanism, and an optical finder 44 (FIG. 4). The CCD 12 converts the optical image of a subject entered from the optical block 11 into electric signal. The operation of the units within the optical block 11 and the driving timing of the CCD 12 are controlled according to a control signal from the CPU 18. The A/D converter 13 converts the image signal supplied from the CCD 12 into digital signal.

The image signal processor 14 performs various image signal processing including AGC (Auto Gain Exposure) processing, AWB (Auto White Balance) processing, AF (Auto Focus) processing, and AE (Auto Exposure) processing on the image signal entered from the A/D converter 13. Further, it performs the compression encoding processing on the processed image signal according to predetermined static image data format of the JPEG (Join Photographic Coding Experts Group) or predetermined moving image data format of the MPEG (Moving Picture Experts Group). Further, it performs the decompression decoding processing on the coded data of the static image or the moving image read out from the recording media 23.

The stroboscope 15 irradiates the subject with stroboscopic light according to a control from the CPU 18. A microphone 16a is connected to the A/D converter 16. The A/D converter 16 converts the sound signal collected through the microphone 16a into digital signal and supplies it to the CPU 18. An amplifier 17a is connected to the D/A converter 17 and a speaker 17b is connected to the amplifier 17a. The D/A converter 17 converts the digital sound data supplied from the CPU 18 into analog signal, and supplies it to the amplifier 17a. The sound signal supplied to the amplifier 17a is amplified and supplied from the speaker 17b.

The CPU 18 controls the whole operation of the DSC 1 while running various programs stored in the flash memory 19 according to the input signal from the input unit 22. The flash memory 19 is formed by, for example, EEPROM (Electrically Erasable Programmable Read Only Memory), which stores various programs to be performed by the CPU 18 and data required for the processing. The RAM 20 is formed by, for example, SDRAM (Synchronous-Dynamic RAM), which temporarily stores the data during the operation of the CPU 18.

A display 21a formed by, for example, LCD (Liquid Crystal Display) is connected to the display processing unit 21. The display processing unit 21 creates an image signal so as to be displayed on the display 21a, from the image data supplied from the CPU 18 and supplies it to the display 21a, where the corresponding image is displayed. The input unit 22 includes various kinds of buttons such as a shutter release button 41, a menu button 42,and a cursor position determination button 43 (in FIG. 4), a lever, and a dial for a user's input operation, and it supplies a control signal to the CPU 18 according to the user's input operation. The recording media 23 is to be removable and it records the coded data of the picked-up static image or moving image. The recording media 23 is formed by, for example, a flash EEPROM.

A USB connector 24a is connected to the USB controller 24. The USB controller 24 works as a communication interface in order to transfer data between the system bus 25 and the PC 3 or the printer 4 which is connected to the USB connector 24a through the USB cable 2, according to the USB standard.

The DSC 1 can transfer the coded data (hereinafter, also referred to as image data) recorded in the recording media 23 to the PC 3 or the printer 4 through the USB controller 24, the USB connector 24a and the USB cable 2. It can also receive the data file transmitted from the PC 3 in the USB controller 24 and record it in the recording media 23, or reproduce the data file and output it.

The basic operation of the DSC 1 will be described in picking up the static image, by way of example.

When a user gets the DSC 1 ready toward a subject, the optical block 11 gains the optical image of the subject, the CCD 12 converts it into electric signal, and then the image signal obtained by the A/D converter 13 converting it into digital signal is supplied to the image signal processor 14 through the system bus 25. The image signal processor 14 performs the image signal processing on the input image signal and supplies the processed image signal to the display processing unit 21. In this way, a camera through image is displayed on the display 21a. A user can use the display 21a as a finder.

When the shutter release button forming the input unit 22 is pushed down in this state, the CPU 18 operates the shutter of the optical block 11. At this time, it makes the stroboscope 15 emit light depending on necessity. Here, the CPU 18 performs the compression encoding processing on the processed image signal for one frame which is supplied from the A/D converter 13, according to the static image data format of JPEG, through controlling the image signal processor 14 and stores the coded data of the obtained static image into the recording media 23 through the system bus 25.

When the coded data (hereinafter, also described as the image data) stored in the recording media 23 is reproduced and displayed, the image data read from the recording media 23 is decompressed and decoded by the image signal processor 14 and supplied to the display processing unit 21. Thus, the reproduced image is shown on the display 21a.

FIG. 3 shows the constitutional example of the USB controller 24. The USB controller 24 includes a connection checking unit 31, a mode preserving unit 32, a descriptor communication unit 33, a communication specification checking unit 34,and a data communication unit 35.

The connection checking unit 31 checks whether the PC 3 or the printer 4 is connected to the DSC 1 through the USB connector 24a and the USB cable 2. The mode preserving unit 32 preserves the information indicating which mode is selected by a user, of the standard mode, the Pict Bridge mode, and the PTP mode. The descriptor communication unit 33 notifies the communication specification checking unit 34 of the usable Configuration (communication specification) in the selected mode, in reply to a request from the PC 3 of the connecting party, by using the descriptor. For example, in the standard mode, it notifies the unit 34 of two, the Pict Bridge and the Mass Storage, as the usable Configuration. In the Pict Bridge mode, it notifies the unit 34 of the Pict Bridge as the usable Configuration. In the PTP mode, it notifies the unit 34 of the PTP as the usable Configuration.

The communication specification checking unit 34 checks the Configuration (Pict Bridge, Mass Storage, or PTP) requested of the DSC 1 by the USB host, according to the Configuration value notified by the USB host of the PC 3 corresponding to the descriptor indicating the usable Configuration notified by the descriptor communication unit 33. For example, when the connected USB host is PC 3, since the Configuration value indicating the Mass Storage or the PTP is notified, it is judged that the Configuration requested of the DSC 1 by the PC 3 is the Mass Storage or the PTP. When the connected USB host is the printer 4, since the Configuration value indicating the Pict Bridge is notified, it is judged that the Configuration requested of the DSC 1 by the printer 4 is the Pict Bridge.

The data communication unit 35 communicates the image data according to the communication specification corresponding to the result of the communication specification checking unit 34.

The user's operation of selecting the above-mentioned three types of modes at the USB connection will be described with reference to FIG. 4 and FIG. 5. FIG. 4 is a perspective appearance view of the rear surface of the DSC 1. As illustrated in FIG. 4, the DSC 1 is provided with a release button 41 on its top surface and a menu button 42, a cursor position determination button 43, an optical finder 44, and the display 21a on its rear surface.

The release button 41 is operated in indicating the focus timing and the shutter timing. The menu button 42 is operated, for example, in directing the display 21a to show various setting screens as shown in FIG. 5. The cursor position determination button 43 is used for moving the cursor on the setting screen shown on the display 21a and determining the information indicated by the cursor. The optical finder 44 is used for determining the composition at the image pick-up.

Figure 5A:
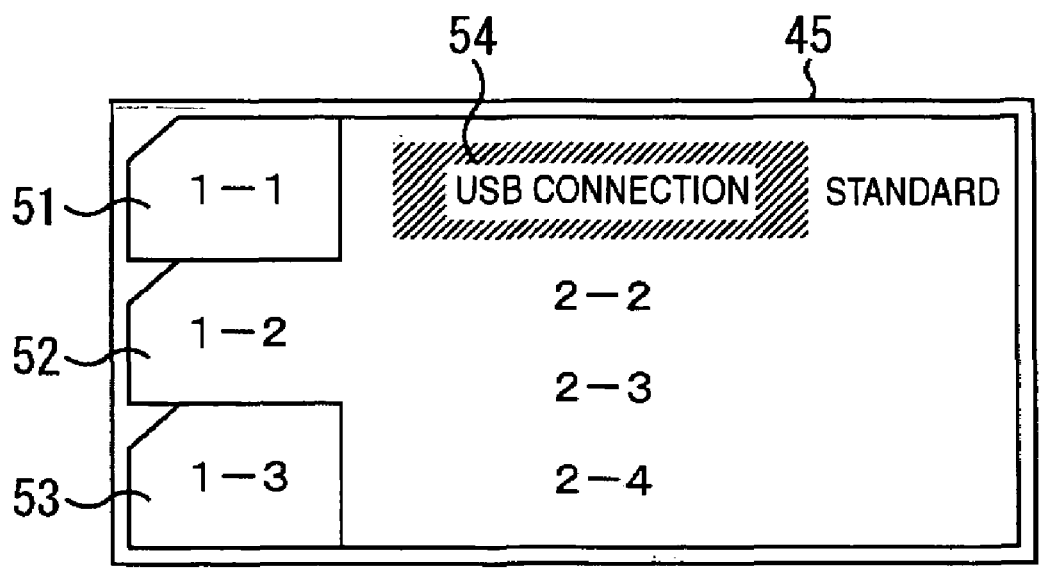
FIG. 5 is a view showing a display example of a screen for setting the mode at a USB connection.

FIG. 5 shows a display example of the setting screen shown on the display 21a according to the operation of the menu button 32. This setting screen includes, for example, three pages, and when a tab 51 is selected, the first page of the setting screen is displayed. When a tab 52 is selected, the second page of the setting screen is displayed. When a tab 53 is selected, the third page of the setting screen is displayed. FIG. 5A shows the state in which the tab 52 is selected and the second page is displayed. In the second page, the first to the fifth items are provided. The first item of the second page indicates the mode setting at the USB connection.

Figure 5B:
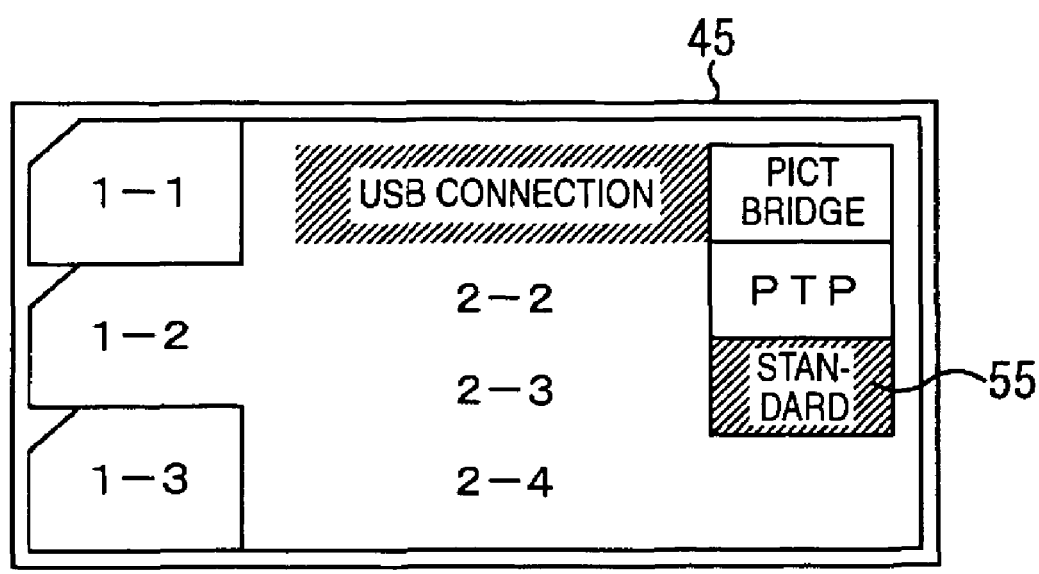

When a user selects one of the three types of modes at the USB connection, the user has to move the cursor 54 to the first item of the second page and define it, further move the cursor 55 to the three types of modes at the USB connection as shown in FIG. 5B in reply to the definition of the cursor 54, and then to select one mode (usually, the standard mode) and define it. These operations, upon receipt through the input unit 22, are converted into the control signal and notified to the CPU 18, the selected mode by a user is judged by the CPU 18, and the judgment result is preserved in the mode preserving unit 32 of the USB controller 24.

Figure 6:
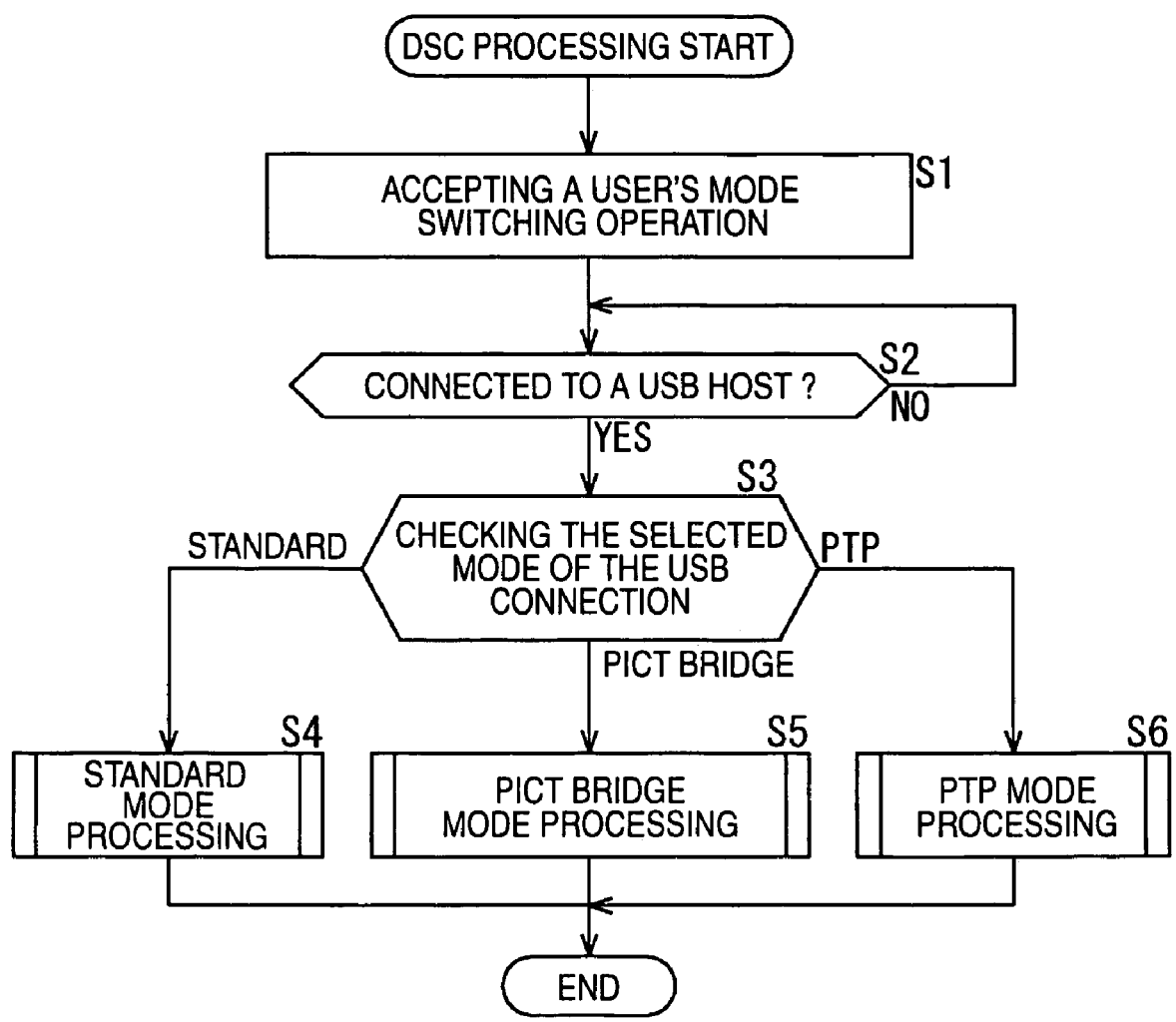
FIG. 6 is a flow chart of use in describing the processing of the DSC at the USB connection.

The processing of connecting the DSC 1 to the USB host such as the PC 3 or the printer 4 will be described referring to the flow chart of FIG. 6, this time. In Step S1, the input unit 22 accepts the user's operation of selecting the mode at the USB connection and supplies the control signal corresponding to this operation to the CPU 18. The CPU 18 judges the mode at the USB connection selected by the user, according to the control signal from the input unit 22, and notifies the judgment result to the mode preserving unit 32 of the USB controller 24. Here, the processing in Step S1 may be omitted.

In Step S2, the connection checking unit 31 of the USB controller 24 checks whether or not the USB host such as the PC 3 is connected through the USB connector 24a and the USB cable 2, and it keeps waiting until judging that it is connected. When the USB host such as the PC 3 is connected through the USB connector 24a and the USB cable 2, the processing proceeds to Step S3. The USB host with the DSC 1 connected to through the USB cable 2 transmits a descriptor request to the DSC 1.

In Step S3, the descriptor communication unit 33 checks the mode at the USB connection selected by a user, according to the information preserved in the mode preserving unit 32. When it judges that the standard mode is selected, the processing proceeds to Step S4, where the processing in the standard mode is performed. When it judges that the Pict Bridge mode is selected, the processing proceeds to Step S5, where the processing in the Pict Bridge mode is performed. When it judges that the PTP mode is selected, the processing proceeds to Step S6, where the processing in the PTP mode is performed.

Figure 7:
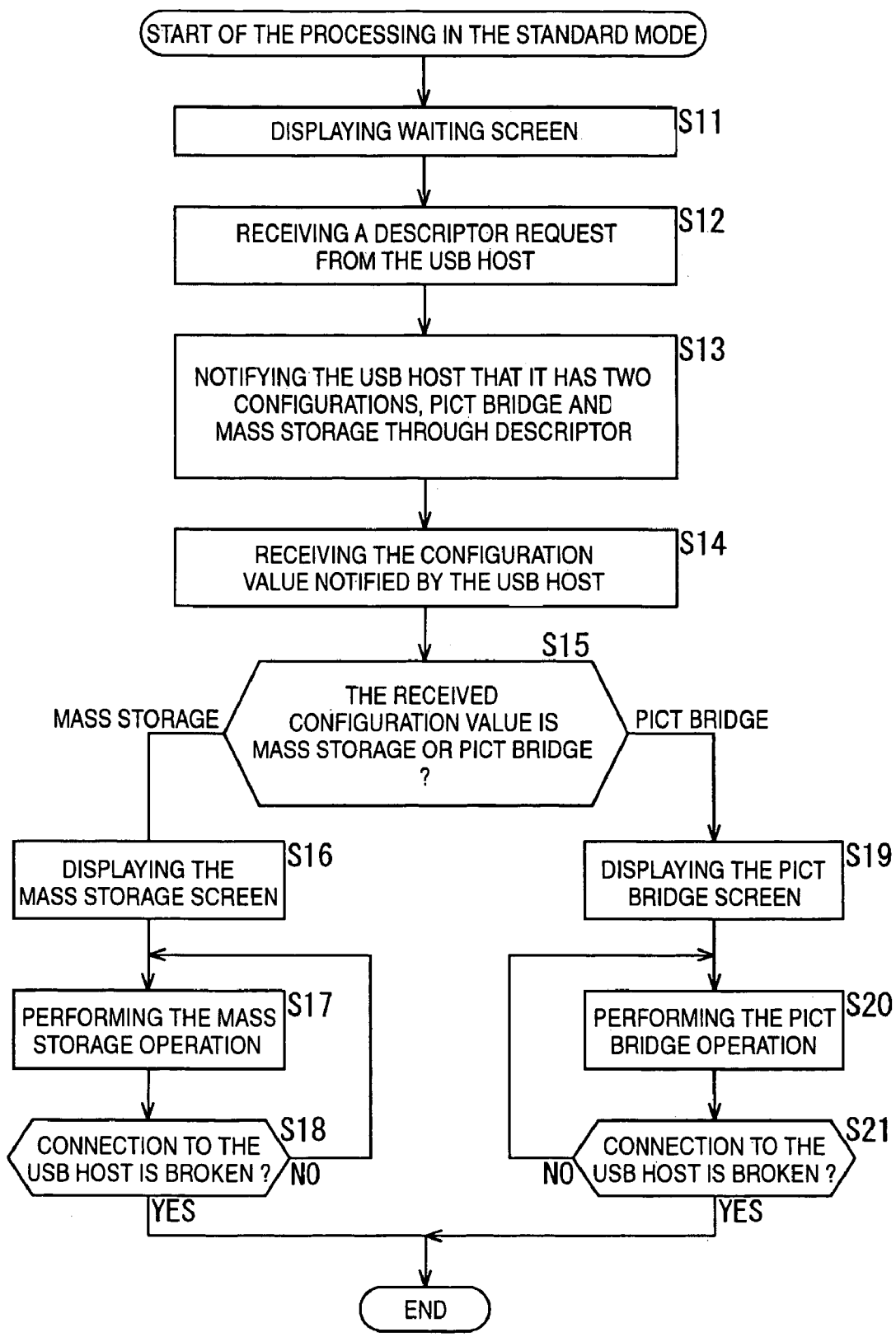
FIG. 7 is a flow chart for use in describing the processing of the standard mode in Step S4 of FIG. 6.

The processing of the standard mode in Step S4 will be described referring to the flow chart of FIG. 7. In Step S11, the CPU 18 supplies the image data of the waiting screen to the effect that this is waiting for a connection with a USB host to the display processing unit 21. The display processing unit 21 directs the display 21a to display the corresponding waiting screen, according to the input image data. In Step S12, the descriptor communication unit 33 receives the descriptor request transmitted by the connected USB host.

In reply to the received descriptor request, in Step S13, the descriptor communication unit 33 notifies the USB host of the two Configurations, the Pict Bridge and the Mass Storage, through descriptor. As for this notification, when the USB host is the PC 3, the Configuration value indicating the Mass Storage is returned. When the USB host is the printer 4, the Configuration value indicating the Pict Bridge is returned.

In Step S14, the descriptor communication unit 33 receives the Configuration value returned by the USB host. In Step S15, the communication specification checking unit 34 checks the Configuration (Pict Bridge or Mass Storage) requested of the DSC 1 by USB host, according to the received Configuration value. When it judges that the Configuration requested by the USB host is the Mass Storage, the processing proceeds to Step S16. In this case, the connected USB host is considered to be the PC 3.

In Step S16, the CPU 18 supplies the image data of the screen to the effect that the Mass Storage function is enable, to the display processing unit 21. The display processing unit 21 directs the display 21a to show the corresponding screen according to the input image data. In Step S17, the data communication unit 35 transmits the image data recorded in the recording media 23 to the USB host and receives the data transmitted from the USB host, according to the control from the USB host based on the Mass Storage communication specification.

In Step S18, the connection checking unit 31 checks whether the USB connection with the USB host is broken or not. When it judges that the USB connection is not broken, the processing returns to Step S17, where it keeps the communication with the USB host conforming to the Mass Storage communication specification. In Step S18, when it judges that the USB connection is broken, the processing in this standard mode is finished.

In Step S15, when the Configuration requested by USB host is judged to be the Pict Bridge, the processing proceeds to Step S19. In this case, the connected USB host is considered to be the printer 4.

In Step S19, the CPU 18 supplies the image data of the screen indicating to the effect that the Pict Bridge function is enabled, to the display processing unit 21. The display processing unit 21 directs the display 21a to show the corresponding screen, according to the input image data. In Step S20, the data communication unit 35 supplies the image data recorded in the recording media 23 to the USB host, according to the Pict Bridge communication specification.

In Step S21, the connection checking unit 31 checks whether the USB connection with the USB host is broken or not. When it judges that the USB connection is not broken, the processing returns to Step S20, where it keeps the communication with the USB host conforming to the Pict Bridge communication specification. In Step S21, when it judges that the USB connection is broken, the processing in this standard mode is finished.

Figure 8:
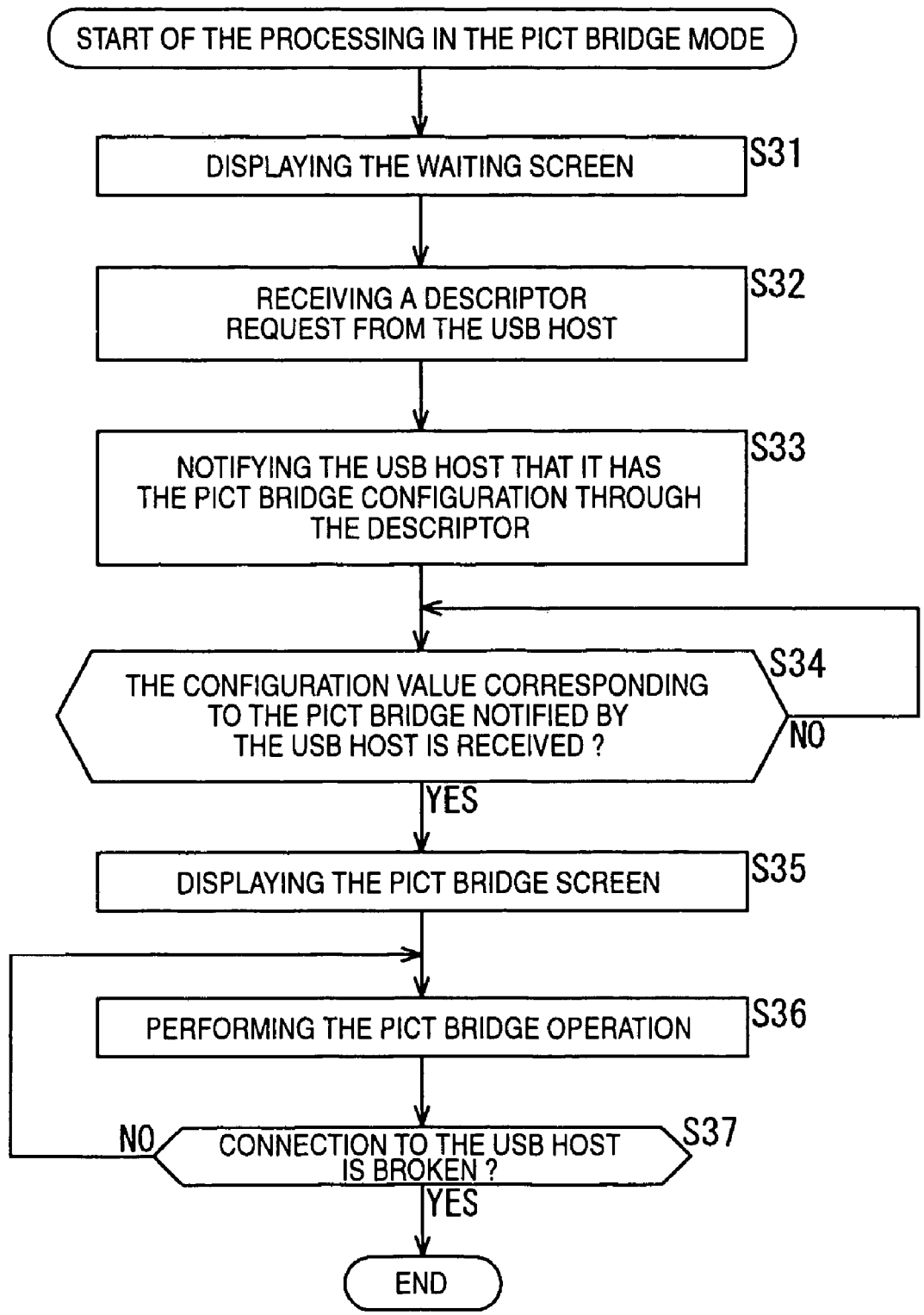
FIG. 8 is a flow chart for use in describing the processing of the Pict Bridge mode in Step S5 of FIG. 6.

The processing in the Pict Bridge mode in Step S5 of FIG. 6 will be described referring to the flow chart of FIG. 8. In Step S31, the CPU 18 supplies the image data of the waiting screen to the effect that this is waiting for the connection with a USB host, to the display processing unit 21. The display processing unit 21 directs the display 21a to show the corresponding waiting screen according to the input image data. In Step S32, the descriptor communication unit 33 receives the descriptor request transmitted by the connected USB host.

In reply to the received descriptor request, in Step S33, the descriptor communication unit 33 notifies the USB host of the Configuration of the Pict Bridge through the descriptor. As for this notification, when the USB host is the printer (for example, the printer 4) supporting the Pict Bridge function, the Configuration value indicating the Pict Bridge is notified.

In Step S34, the descriptor communication unit 33 keeps waiting until receiving the Configuration value indicating the Pict Bridge from the USB host. When it cannot receive the Configuration value indicating the Pict Bridge from the USB host even after waiting for a predetermined hour, the processing in this Pict Bridge mode may be finished. When receiving the Configuration value indicating the Pict Bridge from the USB host, the processing proceeds to Step S35.

In Step S35, the CPU 18 supplies the image data of the screen to the effect that the Pict Bridge function is enabled, to the display processing unit 21. The display processing unit 21 directs the display 21a to show the corresponding screen according to the input image data. In Step S36, the data communication unit 35 supplies the image data recorded in the recording media 23 to the USB host, according to the Pict Bridge communication specification.

In Step S37, the connection checking unit 31 checks whether the USB connection with the USB host is broken or not. When it judges that the USB connection is not broken, the processing returns to Step S36, where it keeps the communication with the USB host conforming to the Pict Bridge communication specification. In Step S37, when it judges that the USB connection is broken, the processing in this Pict Bridge mode is finished.

Figure 9:
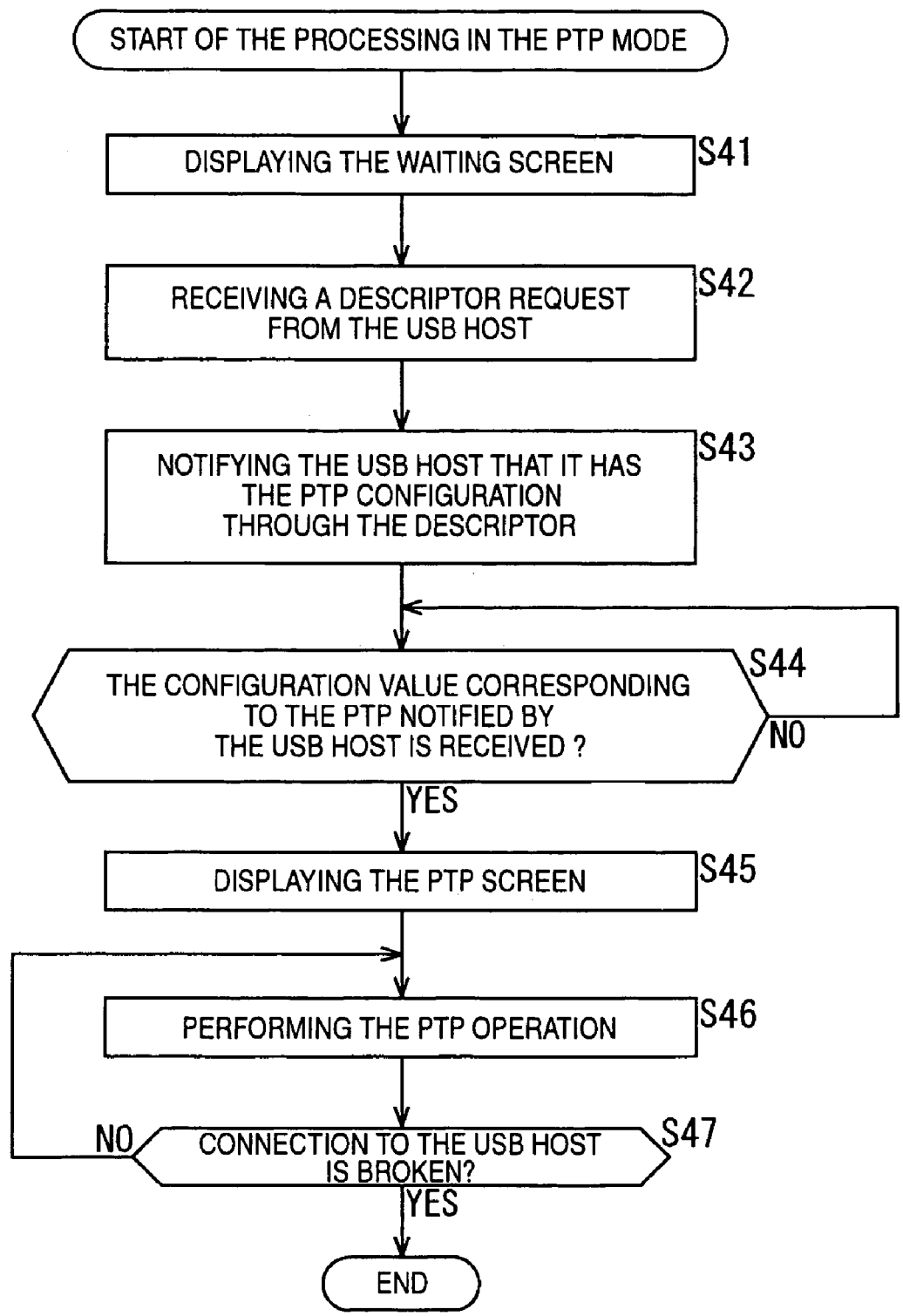
FIG. 9 is a flow chart for use in describing the processing of the PTP mode in Step S6 of FIG. 6.

The processing in the PTP mode in Step S6 of FIG. 6 will be described referring to the flow chart of FIG. 9. In Step S41, the CPU 18 supplies the image data of the waiting screen to the effect that this is waiting for the connection with a USB host, to the display processing unit 21. The display processing unit 21 directs the display 21a to show the corresponding waiting screen according to the input image data. In Step S42, the descriptor communication unit 33 receives the descriptor request transmitted by the connected USB host.

In reply to the received descriptor request, in Step S43, the descriptor communication unit 33 notifies the USB host of the Configuration of the PTP through the descriptor. As for this notification, when the USB host is the personal computer (for example, the PC 3) supporting the PTP communication specification, the Configuration value indicating the PTP is notified.

In Step S44, the descriptor communication unit 33 keeps waiting until receiving the Configuration value indicating the PTP from the USB host. When it cannot receive the Configuration value indicating the PTP from the USB host after waiting for a predetermined hour, the processing in this PTP mode may be finished. When it receives the Configuration value indicating the PTP from the USB host, the processing proceeds to Step S45.

In Step S45, the CPU 18 supplies the image data of the screen to the effect that it operates according to the PTP communication specification, to the display processing unit 21. The display processing unit 21 directs the display 21a to show the corresponding screen according to the input image data. In Step S46, the data communication unit 35 transmits the image data recorded in the recording media 23 to the USB host and receives the data transmitted from the USB host, according to the control from the USB host based on the PTP communication specification.

In Step S47, the connection checking unit 31 checks whether the USB connection with the USB host is broken or not. When it judges that the USB connection is not broken, the processing returns to Step S36, where it keeps the communication with the USB host conforming to the PTP communication specification. In Step S37, when it judges that the USB connection is broken, the processing in this PTP mode is finished.

As mentioned above, the description of the processing of connecting the DSC 1 to the USB host such as the PC 3 or the printer 4 is finished.

As set forth hereinabove, if only the standard mode is selected in the mode at the USB connection, as far as a personal computer or a printer that a user generally uses supports the USB device having a plurality of Configurations, the user does not have to change the USB connection mode even when the USB connecting party of the DSC 1 is changed from the personal computer to the printer or it is changed from the printer to the personal computer. Therefore, convenience for a user is much improved.

When the DSC 1 is connected to a printer which does not support the USB device having a plurality of Configurations although it supports the Pict Bridge function, a user has to select the Pict Bridge mode. When the DSC 1 is connected to a personal computer supporting only the PTP communication specification, a user has only to select the PTP mode.

The above series of processing can be performed by not only hardware constituted as shown in FIG. 3 but also by software. When the series of the processing is performed by the software, a program forming the software is installed from a storing medium (flash memory 19) into a microcomputer (for example, the CPU 18 in FIG. 2) built in the hardware for the exclusive use, to perform the processing.

In this specification, the Steps performed according to the program, of course, include the processing performed in chronological order according to the described procedure and it may include the processing performed in parallel or separately when it is not necessarily performed in chronological order.

The program may be supported by only one computer, or it may be supported dispersedly by a plurality of computers. Further, the program may be transferred to a remote computer and executed there.

In this specification, a system means the whole system including a plurality of units.

It should be understood by those skilled in the art that various modifications, combinations, sub-combinations and alterations may occur depending on design requirements and other factors insofar as they are within the scope of the appended claims or the equivalents thereof.

The invention claimed is:

1. An image recorder for recording image data into a recording medium and supplying the image data recorded into the recording medium to a connected host through a predetermined communication interface, according to one of a plurality of different communication specifications, comprising:
   a notifying device to notify the host of information indicating one or a plurality of different usable communication specifications, in reply to a request from the host;
   a checking device to check a communication specification specified by the host, according to a return from the host based on the information indicating the one or plurality of different usable communication specifications notified by the notifying device;
   a device to supply the image data recorded in the recording medium to the host through the predetermined communication interface, according to the communication specification checked by the checking device; and
   a device to preserve a mode which is selected by a user from a plurality of modes as to said communication specifications,
   in which said plurality of modes includes at least a first mode for notifying the host of information indicating a plurality of different usable communication specifications in reply to a request from the host, and a second mode for notifying the host of information indicating one usable communication specification in reply to a request from the host, and
   in which the notifying device notifies the host of information indicating the plurality of different usable communication specifications when the preserved mode is the first mode, and notifies the host of information indicating one usable communication specification when the preserved mode is the second mode.

2. The image recorder according to claim 1, in which when one usable communication specification is selected, the notifying device notifies the host of the information indicating the communication specification selected.

3. The image recorder according to claim 1, in which said plurality of communication specifications of the first mode includes a communication specification which enables said image recorder to be operated as an external device and a communication specification which is related to printing.

4. The image recorder according to claim 3, in which said communication specification which enables said image recorder to be operated as an external device is Mass Storage Class and said communication specification which is related to printing is Pictbridge.

5. The image recorder according to claim 1, in which the plurality of different usable communication specifications include a first communication specification and a second communication specification, and the one usable communication specification includes at least a third communication specification.

6. The image recorder according to claim 5, in which the first communication specification is Mass Storage Class and the second communication specification is Pictbridge, and the third communication specification is not the Mass Storage Class or the Pictbridge.

7. The image recorder according to claim 6, in which the third communication specification is Picture Transfer Protocol.

8. An image supplying method of an image recorder for recording image data into a recording medium and supplying the image data recorded into the recording medium to a connected host through a predetermined communication interface, according to one of a plurality of different communication specifications, comprising the steps of:
   notifying the host of information indicating one or a plurality of different usable communication specifications, in reply to a request from the host;
   checking a communication specification specified by the host, according to a return from the host based on the information indicating the one or plurality of different usable communication specifications notified through the processing in the notifying step;
   supplying the image data recorded into the recording medium to the host through the predetermined communication interface, according to the communication specification checked through the processing in the checking step; and
   preserving a mode which is selected by a user from a plurality of modes as to said communication specifications,
   in which said plurality of modes includes at least a first mode for notifying the host of information indicating a plurality of different usable communication specifications in reply to a request from the host, and a second mode for notifying the host of information indicating one usable communication specification in reply to a request from the host, and
   in which the notifying step notifies the host of information indicating the plurality of different usable communication specifications when the preserved mode is the first mode, and notifies the host of information indicating one usable communication specification when the preserved mode is the second mode.

9. The method according to claim 8, in which the plurality of different usable communication specifications include a first communication specification and a second communication specification, and the one usable communication specification includes at least a third communication specification.

10. The method according to claim 9, in which the first communication specification is Mass Storage Class and the second communication specification is Pictbridge, and the third communication specification is not the Mass Storage Class or the Pictbridge.

11. The method according to claim 10, in which the third communication specification is Picture Transfer Protocol.

* * * * *